(12) United States Patent
Mason (10) Patent No.: US 8,301,495 B2
(45) Date of Patent: Oct. 30, 2012

(54) SYSTEM AND METHODS FOR DISCOUNT RETAILING

(75) Inventor: Andrew Mason, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 218 days.

(21) Appl. No.: 12/592,947

(22) Filed: Dec. 4, 2009

(65) Prior Publication Data

US 2010/0287044 A1 Nov. 11, 2010

Related U.S. Application Data (60) Provisional application No. 61/215,453, filed on May 5, 2009.

(51) Int. Cl.
*G06Q 30/00* (2012.01)
(52) U.S. Cl. ...................................................... 705/14.1
(58) Field of Classification Search ................... 705/14.1
See application file for complete search history.

(56) References Cited

U.S. PATENT DOCUMENTS

| | | | |
|---|---|---|---|
| 5,715,445 A | 2/1998 | Wolfe | |
| 5,870,770 A | 2/1999 | Wolfe | |
| 5,946,682 A | 8/1999 | Wolfe | |
| 5,970,470 A | 10/1999 | Walker et al. | |
| 6,006,252 A | 12/1999 | Wolfe | |
| 6,049,778 A | 4/2000 | Walker et al. | |
| 6,101,484 A | 8/2000 | Halbert et al. | |
| 6,128,599 A | 10/2000 | Walker et al. | |
| 6,151,603 A | 11/2000 | Wolfe | |
| 6,154,172 A | 11/2000 | Piccionelli et al. | |
| 6,249,772 B1 | 6/2001 | Walker et al. | |
| 6,263,351 B1 | 7/2001 | Wolfe | |
| 6,269,343 B1 | 7/2001 | Pallakoff | |
| 6,292,813 B1 | 9/2001 | Wolfe | |
| 6,301,576 B1 | 10/2001 | Wolfe | |
| 6,327,573 B1 | 12/2001 | Walker et al. | |
| 6,336,131 B1 | 1/2002 | Wolfe | |
| 6,341,305 B2 | 1/2002 | Wolfe | |
| 6,415,262 B1 | 7/2002 | Walker et al. | |
| 6,463,265 B1 | 10/2002 | Cohen et al. | |
| 6,477,581 B1 | 11/2002 | Carpenter et al. | |
| 6,584,451 B1 | 6/2003 | Shoham et al. | |

(Continued)

FOREIGN PATENT DOCUMENTS

| | | |
|---|---|---|
| WO | WO 00/79456 A2 | 12/2000 |
| WO | WO 00/79495 A2 | 12/2000 |

(Continued)

OTHER PUBLICATIONS

U.S. Appl. No. 06/047,266, filed Apr. 2000, Van Horn et al.

(Continued)

*Primary Examiner* — Daniel Lastra
(74) *Attorney, Agent, or Firm* — Brinks Hofer Gilson & Lione (57) ABSTRACT

A system and methods to mutually satisfy a consumer with a discount and a vendor with a minimum number of sales by establishing a tipping point associated with an offer for a good or service. If the tipping point is met, the sale of the good or service is executed and the consumer is charged and receives an indication of the discounted sale, such as a certificate. If the tipping point is not met, the discount offer is abandoned and the consumer is not charged. Once the tipping point is established, the vendor receives a payment, even before the consumer uses the certificate.

30 Claims, 3 Drawing Sheets

U.S. PATENT DOCUMENTS

| | | |
|---|---|---|
| 6,604,089 B1 | 8/2003 | Van Horn et al. |
| 6,604,103 B1 | 8/2003 | Wolfe |
| 6,631,356 B1 | 10/2003 | Van Horn et al. |
| 6,754,636 B1 | 6/2004 | Walker et al. |
| 6,778,837 B2 | 8/2004 | Bade et al. |
| 6,836,476 B1 | 12/2004 | Dunn et al. |
| 6,876,983 B1 | 4/2005 | Goddard |
| 6,918,039 B1 | 7/2005 | Hind et al. |
| 6,928,416 B1 | 8/2005 | Bertash |
| 6,931,130 B1 | 8/2005 | Kraft, IV et al. |
| 6,934,690 B1 | 8/2005 | Van Horn et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis, II et al. |
| 7,039,603 B2 | 5/2006 | Walker et al. |
| 7,043,526 B1 | 5/2006 | Wolfe |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar et al. |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van Horn et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van Horn et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van Horn et al. |
| 7,376,580 B1 | 5/2008 | Walker et al. |
| 7,406,322 B2 | 7/2008 | McMahan et al. |
| 7,409,429 B2 | 8/2008 | Kaufman et al. |
| 7,428,418 B2 | 9/2008 | Cole et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van Horn et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,672,897 B2 | 3/2010 | Chung et al. |
| 7,689,468 B2 | 3/2010 | Walker et al. |
| 7,689,469 B1 | 3/2010 | Mesaros |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,150,735 B2 | 4/2012 | Walker et al. |
| 2002/0023010 A1 | 2/2002 | Rittmaster et al. |
| 2002/0065713 A1 | 5/2002 | Awada et al. |
| 2002/0103746 A1 | 8/2002 | Moffett, Jr. |
| 2003/0004802 A1 | 1/2003 | Callegari |
| 2003/0018559 A1 | 1/2003 | Chung et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0243478 A1 | 12/2004 | Walker et al. |
| 2005/0075945 A1 | 4/2005 | Hodge et al. |
| 2005/0102156 A1 | 5/2005 | Linduff |
| 2005/0221841 A1 | 10/2005 | Piccionelli et al. |
| 2005/0245241 A1 | 11/2005 | Durand et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061220 A1 | 3/2007 | Vaid |
| 2007/0150354 A1 | 6/2007 | Walker et al. |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0027810 A1 | 1/2008 | Lerner et al. |
| 2008/0052186 A1 | 2/2008 | Walker et al. |
| 2008/0052189 A1 | 2/2008 | Walker et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0242514 A1 | 10/2008 | Piccionelli et al. |
| 2009/0024484 A1 | 1/2009 | Walker et al. |
| 2009/0030776 A1* | 1/2009 | Walker et al. .................. 705/10 |
| 2009/0125414 A1 | 5/2009 | Kleinrock et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0076832 A1 | 3/2010 | Cha |
| 2010/0114132 A1 | 5/2010 | Piccionelli et al. |
| 2010/0146604 A1 | 6/2010 | Piccionelli |
| 2011/0054996 A1 | 3/2011 | Spector |
| 2011/0099082 A1 | 4/2011 | Walker et al. |
| 2012/0054031 A9 | 1/2012 | Walker et al. |

FOREIGN PATENT DOCUMENTS

| | | |
|---|---|---|
| WO | WO 01/08024 A2 | 2/2001 |
| WO | WO 01/11483 A2 | 2/2001 |
| WO | WO 01/50301 A2 | 7/2001 |
| WO | WO2009094385 A2 | 7/2009 |

OTHER PUBLICATIONS

Emily S. Rueb, "Group Buying, Better Together"; The New York Times City Room Blog, Feb. 16, 2010.

Robert J. Kauffman and Bin Wang, "Bid Together, Buy Together: On the Efficacy of Group-Buying Business Models in Internet-Based Selling"; "The (R)evolution Goes Mobile", 5th Annual University of Minnesota Electronic Commerce Conference, Mar. 27-28, 2001, Carlson School of Management, University of Minnesota, Minneapolis Minnesota.

Krishnan S. Anand and Ravi Aron (OPIM Department, The Wharton School, University of Pennsylvania), "Group Buying on the Web: A Comparison of Price Discovery Mechanisms", Management Science, vol. 49, No. 11, pp. 1546-1562, Nov. 2003.

Editor, "Technology Drives ActBig 'Next Generation' GroupBuying Application", Market Wire, Feb. 29, 2005.

Staff, "ActBig.com muscles in on group buying power", RedHerring.com, Oct. 13, 1999.

Charles Bermant, "ActBig: Save Big", Internetnews.com, Nov. 16, 1999.

Alan S. Davis "Group Buying on the Internet", Seminar Presentation Slides, University of Minnesota, MIS Research Center, Mar. 10, 2006.

Office Action issued in corresponding U.S. Appl. No. 12/776,028 dated Mar. 20, 2012 (13 pgs).

* cited by examiner

SYSTEM AND METHODS FOR DISCOUNT RETAILING

This application claims the benefit of U.S. Provisional Application No. 61/215,453 filed May 5, 2009.

FIELD OF THE INVENTION

This invention relates generally to the offer and sale of goods and services, and more specifically to a system and methods for offering goods and services of others at a discount on a network such as the Internet, wherein the sale of the goods and services is contingent upon a certain number of actual sales, i.e., a tipping point, where the merchant ultimately providing the goods or services does not pay the out-of-pocket expenses for advertising and marketing the goods or services, and receives the revenue generated from the sales of the discounted goods or services before actually providing those goods or services.

BACKGROUND OF THE INVENTION

Retailing is the exchange—sale and purchase—of goods and services between a vendor or merchant and a consumer or customer. Typically, negotiation is absent between the vendor and consumer with respect to the terms of a sale or purchase of a good or service. Retailing characteristically employs a vendor-controlled format whereby the vendor determines which goods or services to offer for sale, when the goods or services will be offered for sale, and the non-negotiable fixed price at which the good or service will be sold.

Discounts are an integral part of retail strategies for many goods and services. Vendors rely upon discounts for a variety of reasons, such as to promote new and existing goods and services and to increase the sales of that particular item or service, or to increase the sales of the merchant's other goods and services. Further, consumers rely upon discounts as a way to reduce their costs.

Discount techniques include providing coupons and rebates to potential customers, but these techniques have several disadvantages, such as an historically small percentage of consumer participation and fraud. Since the participation level is so small, merchants are forced to canvass an area to attract the correct demographic of potential customers for its products or services. Most of the coupons or rebates (or the advertisements containing the coupons or rebates) end up with consumers that do not need or want the goods or services.

Further, fraud is an increasing problem in that coupons may be copied, or rebates may be used to obtain cash back for goods and services that the fraudulent consumer never actually purchased.

Coupons and rebates are typically distributed using direct mail, newspaper print, and magazines and have associated with them a low percentage of users of those actually receiving the coupons. Besides not being environmentally friendly due to paper waste, coupons and rebates may not be cost effective.

Further, advertising and marketing associated with coupons and rebates can be expensive when done through radio or television medium, and extremely ineffective when done through print advertisements. Regardless of the advertising medium however, there is very little reason for the consumer to pass along the advertisement or coupon to others, so that a merchant must advertise or market the discount to each individual.

A vendor offers coupons or rebates in the hopes of securing future sales at full retail prices, repeat sales and ultimately an increase in overall sales. Ultimately, vendors cannot offer goods and services at a discount unless the vendor can ensure a minimum number of sales to justify the discount.

Discounting techniques also include pricing curve group discount models, but traditional pricing curve group discount models confuse consumers and leave them feeling like they did not get the best possible deal.

There is currently no system and methods to mutually satisfy the consumer with a discount and the vendor with a minimum number of sales, while at the same time providing the merchant with expense-free advertising and marketing for the goods or services. There is also no system or methods that utilize the strength of a social network to distribute information about the discounts, and create an incentive for the customer to distribute the information about the discount.

There is also no current system that pays the merchant for the sale of the discounted items sold up front, prior to the merchant having to provide the goods or services to the customer that has paid for those goods or services. The present invention satisfies these needs.

SUMMARY OF THE INVENTION

The present invention is a system and methods to mutually satisfy the consumer with a discount for the purchase of goods or services on the one hand, and the vendor with a minimum number of sales at that discounted price. The minimum number of sales of the goods or services is also known as the tipping point.

The present invention also provides a merchant with inexpensive or free advertising and marketing of the particular goods or services being offered for sale, utilizing the strength of a social network, along with a guarantee that the sale price will only have to be honored if a minimum number of customers not only accept the offer, but also pay the discounted price in advance, for the goods or services. Accordingly, a merchant can provide a greater or deeper discount knowing that at least a certain number of sales will occur at that discount.

Since, in accordance with the present invention, the sales are made at the time that the consumer decides to accept the offer, even before taking possession of the goods or receiving the services, and only if the minimum number of sales are attained, the money from the sales can be immediately (or soon thereafter) provided to the merchant, thereby providing the merchant with the revenue from the sale of the goods or services in advance of the merchant providing the goods or services to the customer.

The sale price may remain available for a limited time, for example, twelve hours or one day, or until the number of sales equals or exceeds the minimum or tipping point by a given amount. For example, the tipping point may be reached when 100 individuals accept an offer to purchase a discounted sandwich, and the offer ends when 200 individuals accept the offer to purchase the discounted sandwich.

Further, the discount available may be modified as the number of actual customers increase. For example, the first 25 customers to purchase an item may receive a 50% discount, while the next 25 customers for that same item receive a 40% discount, and so on. By creating these limitations on the discounts as the number of deals are accepted (and purchased), there is incentive for consumers to watch the deals carefully to be able to react quickly.

According to the present invention, a merchant or vendor is selected for participation in discount retailing. The merchant may request to have its goods or services offered, or the company providing the services can solicit merchants to become part of the system. The vendor may be any individual or company that provides goods or services to a consumer, and may be local, national or global. The merchant's goods or services are identified for a discount offering and a minimum number of accepted deals, or the tipping point, is determined. The tipping point is defined as the minimum quantity of the particular goods or services to be accepted by the consumers, or the critical mass, in order to execute the sale of the goods or services. Typically, the vendor sets the tipping point.

Next, terms of the offer are determined and may include a discount or varying discounts to be provided, duration of the offer, maximum number, if any, of the goods or services the vendor is willing to offer for sale, expiration of the goods or services, or any other restrictions or limitation associated with the offer.

The discount offer is then exploited, either through a global communication network, such as the Internet, or through some other vehicle that will be accessible to consumers, such as an Intranet, email or another communication network. If the Internet is used, a website can be generated and updated with the offer such that consumers can accept the offer. Consumers can "sign up" for offers on the website and even to receive updates as they occur. "Signing up" may entail providing one or more of the following types of information: the name of the consumer, address of the consumer, email address, and a form of payment to purchase the discount offer, such as a credit card or debit card. Although signing up is not necessary to participate in the offers (one can accept an offer and provide payment information each time), by signing up, the consumer can more easily and more quickly take advantage of any offer.

Consumer participation is received in the way of accepted offers, and calculated in terms of the number of consumers that accepted the discount offer. If the number of consumers that participated by accepting the discount offer equals or exceeds the tipping point, then the offer of the sale of the good or service becomes valid or legitimate, and each customer that has accepted the offer is charged using their method of payment, i.e., credit card, debit card, Paypal®, or in other ways utilizing a method of payment. The customer is then provided with a receipt of purchase, such as an email, coupon, gift certificate, etc. that can be printed out for redemption (or used as a receipt on a cell phone, etc.)

At this time (or shortly thereafter), the merchant receives a payment based on the previous agreement for a portion of the sale of the discounted goods or services, after taking out the cost charged by the owner of the system or platform.

The consumer can then take the printed receipt of purchase (or other indication of purchase) to the merchant, who will provide the goods or services purchased at the reduced price. Alternatively, the list of customers that accepted the (now valid) offer and purchased the discounted goods or services can be forwarded to the merchant for providing the goods or services. These two methods for validate the purchase can also be used in combination.

Conversely, if the number of customers that participated by accepting the discount offer does not reach the tipping point in the allotted time, then the offer is rescinded or rejected, the consumer is not charged for the purchase, and the merchant does not receive a payment (or have to provide the goods or services).

Customers can also sign up to receive an email when the deal is announced, and can access the system through one of the many social networking website systems, such as Facebook or Twitter. Further, customers can set up an account for purchasing the deals and receive credits or money toward future deals by referring other customers to sign up and purchase a deal.

An object of the present invention is to provide consumers with a discount on goods and services, while providing the merchant inexpensive or free advertising and marketing for those goods or services.

Another object of the present invention is to provide a guaranteed minimum number of sales of a particular item or service, otherwise no sale at that discounted price occurs—the sale only occurs if a minimum number of customers accept the deal.

Another object of the present invention is for the vendor to gain exposure to a new audience and create an incentive for the customer to market the deal to other customers, and to provide a vehicle, such as a website on the Internet, in which large numbers of consumers return to that particular vehicle to find out about new deals.

Another object of the present invention is to provide the merchant with revenue from the sales (if the minimum is attained and the offer becomes valid) prior to delivering the goods or providing the services to the customer.

Another object of the present invention is to provide a system and methods for increasing sales, and advertising and marketing the merchant's goods or services.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION OF THE PREFERRED EMBODIMENT

Figure 1:
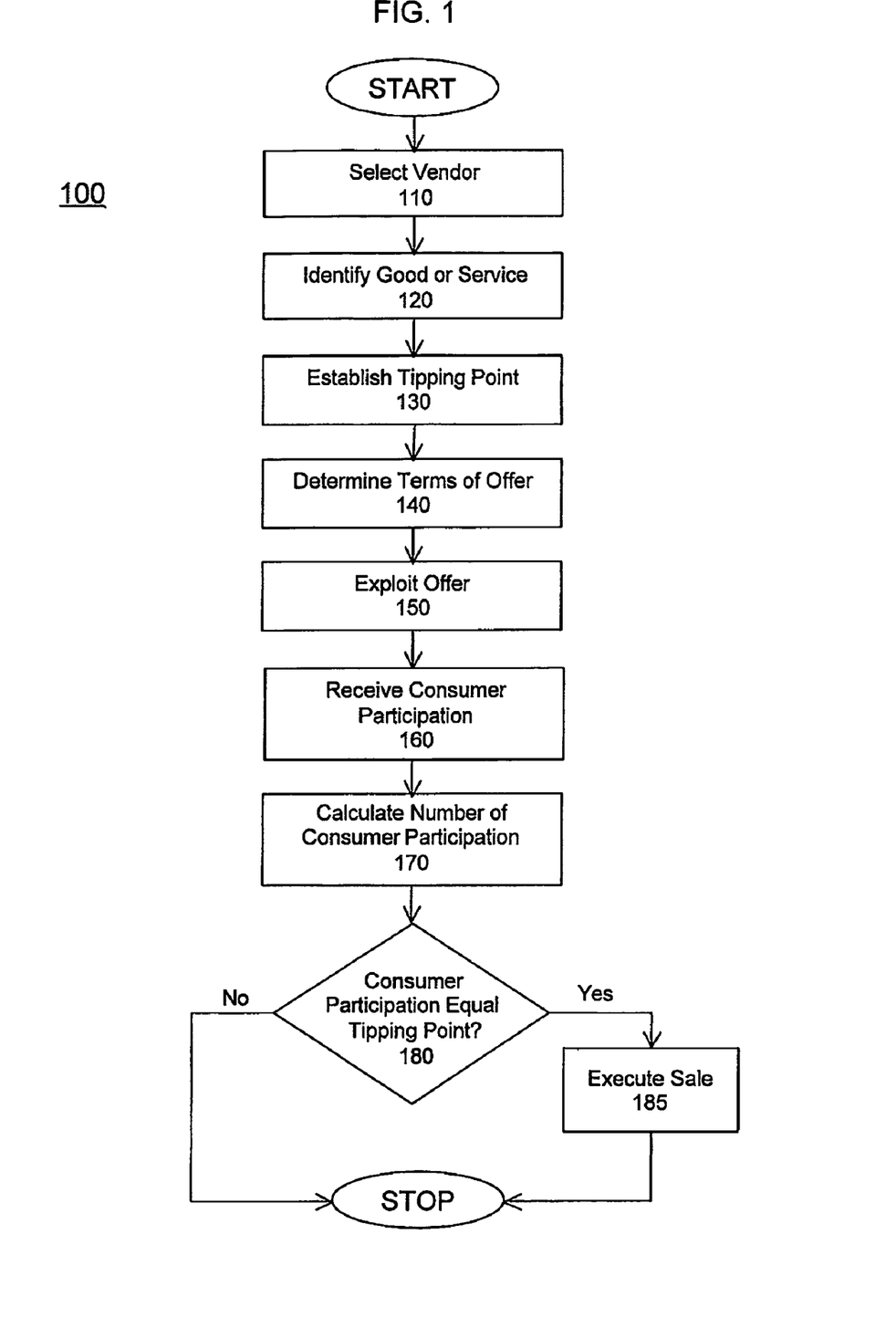
FIG. 1 illustrates a flow chart in accordance with one embodiment of the present invention.

FIG. 1 illustrates a flow chart 100 in accordance with one embodiment of the present invention. As shown in FIG. 1, a vendor is selected at step 110 for participation in the present invention. The vendor may be any individual or entity that provides goods or services to a consumer. The vendor may be local, national or global in terms of the geography the vendor provides products or services, and the vendor may be solicited for the system or may hear of the system and may approach the system's provider without being solicited. Additionally, a product or service provided by the vendor is identified for a discount offering at step 120. The good may be any product sold or distributed by the vendor, and the service likewise, can be any service provided by the vendor.

A tipping point is then determined at step 130. Again, the tipping point is defined as the minimum quantity of the good or service to be accepted by consumers in order to validate the deal and execute the sale of the good or service. Typically, the vendor sets the tipping point, for example, 300 or more hamburgers must be sold in order for the discount to be valid.

At step 140, terms of the discount offer are determined and may include some or all of the following (along with other terms as needed): discount to be provided, duration of the offer, for example 24 hours, and maximum number, if any, of the good or service the vendor is willing to offer, expiration of the good or service, or restrictions associated with the good or service.

At step 150 the discount offer is exploited, for example, through a website on the Internet. The offer on the website may include the discount rate and percentage of discount, and pictures of the goods and/or descriptions of the goods or services offered at the discounted rate. Further, the website may also include information about the deal and how close, or it, the tipping point has been attained. For example, if 100 discounted manicures must be accepted before the offer is valid, the website might show that 54 have been accepted, thereby creating an incentive for those that have accepted to contact others to take advantage of the offer.

Consumers participate by accepting the offer such as by "signing up" for the offer on the website. "Signing up" may entail providing the name of the consumer, address of the consumer, and form of payment to purchase the offer. Further, consumers can sign up in advance to make accepting offers easier and faster and to receive offers quicker.

At step 160, the consumer participation is received and calculated in terms of the number of consumers that participated by accepting the discount offer at step 170. As shown by step 180 in FIG. 1, if the number of consumers that participated by accepting the discount offer equals the tipping point established at step 130, the sale of the good or service is executed at step 185. If the number of consumers that participated by accepting the discount offer does not equal the tipping point established at step 130, the offer is abandoned. The sale of the good or service is executed by providing the customer with a gift certificate.

The following is discussed with reference to a restaurant discount of 50%, but is merely exemplary, as the present invention is applicable to a variety of goods, services and various discounts.

Vendor XYZ Restaurant is selected to participate in discount retailing according to the present invention. XYZ Restaurant serves Chicago, Ill. and the Chicagoland area. The tipping point is established at 25, which is the critical mass or minimum quantity that must be accepted by consumers in order to validate the sale of the offer. So, if only 24 people accept the discount offer (in the allotted time) then the offer is rescinded and no customer receives the discount.

Next, terms of the discount offer are determined. The discount to be provided by XYZ Restaurant is $20 in food for the cost of $10, provided the tipping point of 25 is met. Another term is that the offer will run for 8 hours, although any duration can be contemplated. Another term may be that XYZ Restaurant will only provide a maximum of 100 discount offers, although any variation is contemplated, for example, terms of the discount offer could vary with respect to the number of consumers that accept the offer in excess of the tipping point. For example, the first 25 consumers that accept the discount offer receive the 50% discount. The subsequent consumers (number 26 through 50) to accept the offer receive a 40% discount, or $20 in food for the cost of $12. The next subsequent consumers (number 51 through 100) to accept the offer receive a 20% discount, or $20 in food for the cost of $16.

Another term may be that, provided the tipping point is met, the consumer must use the discount offer within two months otherwise it expires. Any expiration date is contemplated including no expiration. Yet another term may be that the discount is applicable to food only, not beverages, but again, any restriction is contemplated such as the discount only applies to alcoholic beverages.

Upon establishing the tipping point and determining the terms, the discount offer is exploited through a website on the Internet. Consumers accept the offer via the website and provide their name, address and credit card number (if they have not already registered). Upon or before the 8 hour duration ends, consumer participation is received by the system and the number of consumers that accepted the discount offer is calculated. In this example, 50 people accepted the offer, which meets and exceeds the tipping point of 25. Therefore, the discount offer is validated and the sale of the service to each of the 50 customers is executed. Each customer's credit card is charged $10 and the consumer receives a $20 gift certificate to XYZ Restaurant. Again, if the number of consumers that accepted the discount offer is calculated at any number less than 25, the discount offer is rescinded and the consumer's credit card is not charged.

Figure 2:
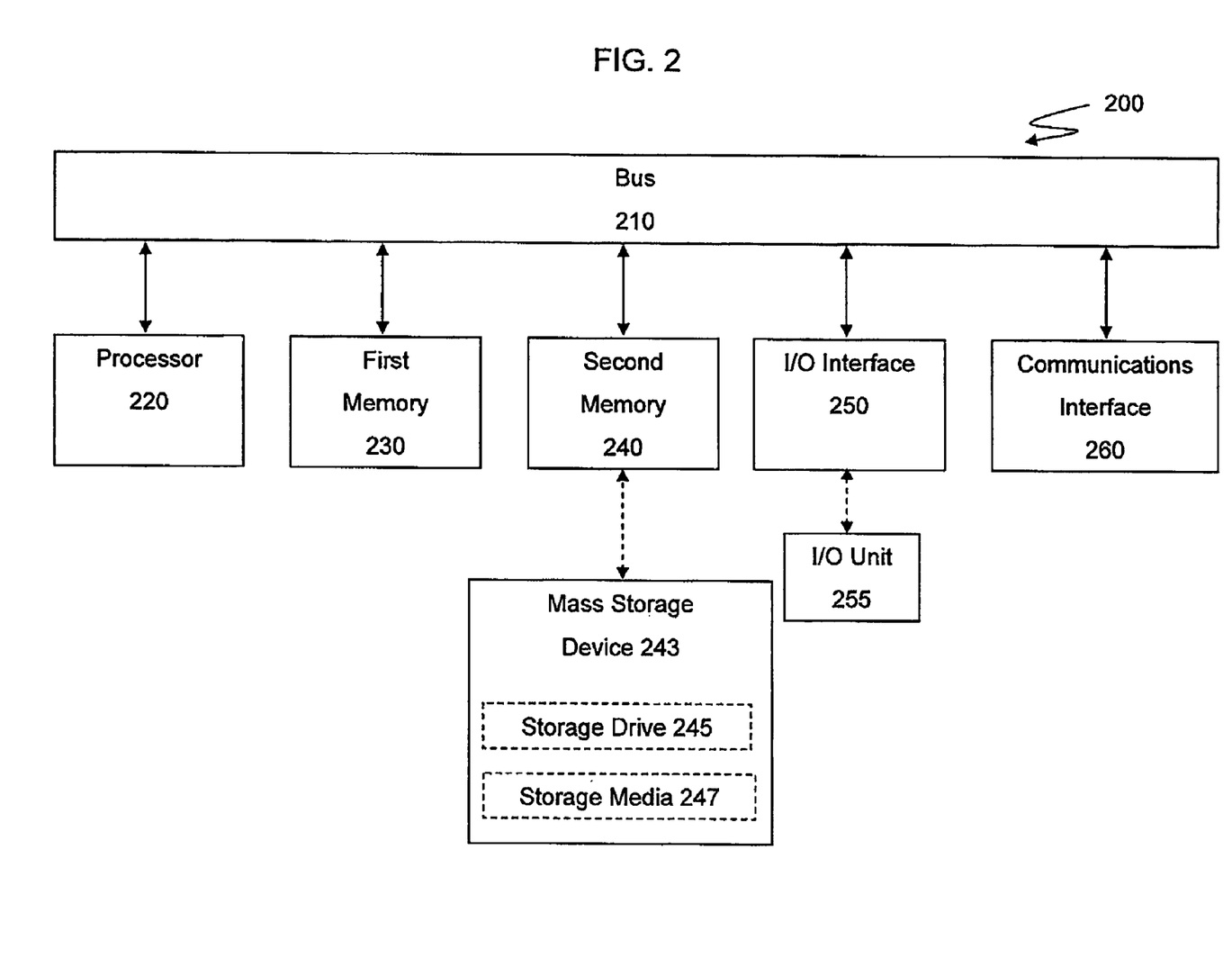
FIG. 2 illustrates an exemplary computer system according to the present invention.

FIG. 2 illustrates an exemplary computer system 200, or network architecture, that may be used to implement the methods according to the present invention. One or more computer systems 200 may carry out the methods presented herein as computer code. One or more processors, such as processor 220, which may be a special purpose or a general-purpose processor is connected to a bus 210. As shown in FIG. 2, bus 210 connects the processor 220 to various other components of the computer system 200, but it is contemplated bus 210 may connect processor 220 to various components (not shown). It is also contemplated that bus 210 connects the processor 220 to other computer systems. Via the bus 210, the processor 220 can receive computer code. The term "computer code" includes, for example, programs, instructions, signals and/or data. The processor 220 executes computer code and may further send the computer code via the bus 210.

Computer system 200 may include one or more memories, such as first memory 230 and second memory 240. It is contemplated that the first memory 230, secondary memory 240, or a combination thereof function as a computer usable storage medium to store and/or access computer code. The first memory 230 and second memory 240 may be, for example, random access memory (RAM), read-only memory (ROM), a mass storage device, or any combination thereof.

As shown in FIG. 2, one embodiment of second memory 240 is a mass storage device 243, although it is contemplated that first memory 230 may be the mass storage device. The mass storage device 243 comprises a storage drive 245 and a storage media 247. It is contemplated the storage media 247 may or may not be removable from the storage drive 245. Mass storage devices 243 with storage media 247 that are removable, otherwise referred to as removable storage media, allow computer code to be transferred to and/or from the computer system 200.

A mass storage device 243 may include, for example, a Compact Disc Read-Only Memory ("CDROM"), ZIP storage device, tape storage device, magnetic storage device, optical storage device, Micro-Electro-Mechanical Systems ("MEMS"), nanotechnological storage device, floppy storage device, hard disk device. Mass storage device 243 also includes program cartridges and cartridge interfaces (such as that found in video game devices), removable memory chips (such as an EPROM, or PROM) and associated sockets.

The computer system 200 may further or alternatively include other means for computer code to be loaded into or removed from the computer system 200, for example, input/output ("I/O") interface 250 and/or communications interface 260. Both the I/O interface 250 and the communications interface 260 allow computer code to be transferred between the computer system 200 and external devices including other computer systems. This transfer may be bi-directional or omni-direction to or from the computer system 200.

Computer code transferred by the I/O interface 250 and the communications interface 260 are typically in the form of signals, which may be electronic, electromagnetic, optical, or other signals capable of being sent and/or received by the interfaces. These signals may be transmitted via a variety of modes including, but not limited to, wire or cable, fiber optics, a phone line, a cellular phone link, infrared ("IR"), and radio frequency ("RF") link.

The I/O interface 250 may be any connection, wired or wireless, that allows the transfer of computer code. An I/O interface 250 includes, for example, an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card. In certain embodiments the I/O interface connects to an I/O unit 255 such as a user interface, monitor, speaker, printer, touch screen display, to name a few.

The communications interface 260 is also any connection that allows the transfer of computer code. Communication interfaces include, but are not limited to, a modem, network interface (such as an Ethernet card), wired or wireless systems (such as Wi-Fi, Bluetooth, IR), local area networks, wide area networks, intranets, etc.

The invention is also directed to computer products, otherwise referred to as computer program products, to provide software that includes computer code to the computer system 200. Processor 220 executes the computer code in order to implement the methods of the present invention. As an example, the methods according to the present invention may be implemented using software that includes the computer code, wherein the software is loaded into the computer system 200 using a memory 230, 240 such as the mass storage drive 243, or through an I/O interface 250, communications interface 260, or any other interface with the computer system 200. The computer code in conjunction with the computer system 200 described herein may perform any one of, or any combination of, the steps of any of the methods presented herein. It is also contemplated that the methods according to the present invention may be performed automatically, or may be invoked by some form of manual intervention.

The computer system 200, or network architecture, of FIG. 2 is provided only for purposes of illustration, such that the present invention is not limited to this specific embodiment. It is appreciated that a person skilled in the relevant art knows how to program and implement the invention using any computer system or network architecture.

Figure 3:
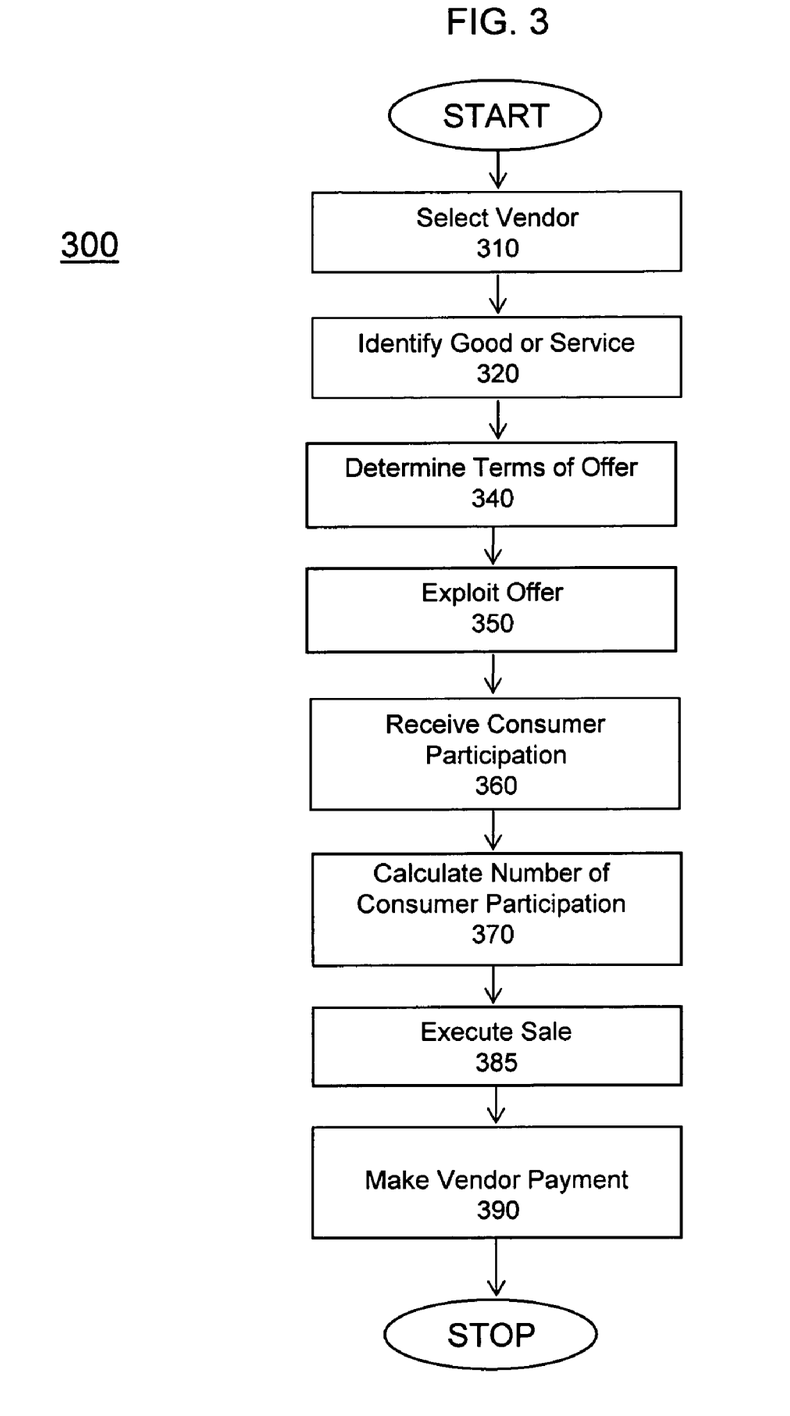
FIG. 3 illustrates a flow chart in accordance with an alternative embodiment of the present invention.

A flow chart 300 representing an alternative embodiment of the present invention is illustrated in FIG. 3. Similar to the flow chart in FIG. 1, a vendor is selected or obtained at step 310 for participation in the present invention and a good or service is identified for the process in step 320.

In the alternative embodiment, no tipping point is established, however, in step 340, terms of the discount offer are determined and include the discount to be provided, duration of the offer, for example 24 hours, and an expiration date of the offer, or other restrictions associated with the offer.

At step 350 the discount offer is exploited through a website on the Internet or on some other global communication network. Consumers participate by accepting the offer such as by "signing up" for the offer on the website. "Signing up" may include providing the name of the consumer, address of the consumer, and form of payment to purchase the offer. The consumer may have already entered personal information that is stored thereby obviating the need to sign up each time to receive an offer. However, the system must be able to track the individual accepting the offer so that the consumer can be charged appropriately at the correct time, which may be when a deal reaches a tipping point (if a tipping point is used), or as soon as the consumer accepts the offer, if there is no tipping point.

At step 360, the consumer participation is received by the system and in step 370, the system calculates the number of consumers that have accepted the discount offer. This calculation can be done on a rolling basis, or at the end of the time limit, which was determined in step 340. Once the offer is accepted by the consumer and the consumer has been charged for the sale of the good or service, the consumer receives an indication that will allow him or her to receive the product or service. For example, the consumer may receive a gift certificate indicating the discount offer.

Once the number of consumers accepting the offer has been calculated and the consumers have been charged in step 385, a vendor payment can be made in step 390. The calculation and payment can occur at the end of the deal, based on a time limit, or the calculation can occur at a number of different time intervals, with numerous checks being sent to the vendor.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of the claims.

What is claimed is:

1. A method of discount retailing in which an offer does not become valid until a minimum number of offers are purchased, comprising a network server, a microprocessor, a memory and computer software, said computer software being located in said memory and run by said microprocessor, said computer software comprising a discount retailing algorithm, wherein said discount retailing algorithm comprises the steps of:
    (a) obtaining consent from a merchant to market and advertise an item normally provided by said merchant at a standard offer price;
    (b) determining a discount offer price for said item, said discount offer price being a reduction in amount from the standard offer price of that item;
    (c) deciding on a tipping point at which time the discount offer price becomes valid;
    (d) generating an advertisement to present said discount offer price and said tipping point to potential consumers;
    (e) displaying said advertisement over a network through said network server for a predetermined period of time for potential consumers to review;
    (f) receiving acceptances of the discount offer price for the item over the network for the predetermined period of time;
    (g) determining if the tipping point has been attained; and
    (h) informing each consumer that accepted the discount offer whether or not the tipping point has been attained.

2. The method of discount retailing of claim 1, further comprising the step of sending a payment to said merchant if the tipping point has been attained.

3. The method of discount retailing of claim 1, wherein said item is a product distributed by said merchant.

4. The method of discount retailing of claim 1, wherein said item is a service provided by said merchant.

5. The method of discount retailing of claim 1, wherein said discount offer price is reduced from said standard offer price by an absolute amount.

6. The method of discount retailing of claim 1, wherein said discount offer price is reduced from said standard offer price by a percentage amount.

7. The method of discount retailing of claim 1, wherein said discount offer price varies depending on the number of consumers accepting the discount offer price.

8. The method of discount retailing of claim 7, wherein said discount offer price increases after a certain number of consumers accept the discount offer price.

9. The method of discount retailing of claim 1, wherein said tipping point comprises the number of items for which an offer must be accepted by a consumer in order for the discount offer price to become valid.

10. The method of discount retailing of claim 1, wherein said tipping point comprises a total amount of money to be paid by the consumers that accept the offer in order for the discount offer price to become valid.

11. The method of discount retailing of claim 1, wherein said merchant is not charged for said generating an advertisement.

12. The method of discount retailing of claim 1, wherein said advertisement includes the description of the item being offered at said discount offer price.

13. The method of discount retailing of claim 1, wherein said advertisement includes a picture of the item being offered at said discount offer price.

14. The method of discount retailing of claim 1, wherein said advertisement includes an indication of the amount saved based on the discount offer price.

15. The method of discount retailing of claim 1, wherein said advertisement includes an indication of the percentage saved based on the discount offer price.

16. The method of discount retailing of claim 1, wherein said predetermined period of time is one day.

17. The method of discount retailing of claim 1, wherein said predetermined period of time is less than one day.

18. The method of discount retailing of claim 1, wherein said predetermined period of time is greater than one day.

19. The method of discount retailing of claim 1, wherein said displaying said advertisement over a network through said network server comprises presenting the advertisement to said potential consumers through the display on the potential consumer's computer.

20. The method of discount retailing of claim 1, wherein said displaying said advertisement over a network through said network server comprises presenting the advertisement to said potential consumers through the display on the potential consumer's mobile device.

21. The method of discount retailing of claim 20, wherein said mobile device comprises a cellular telephone, personal digital assistant, or laptop computer.

22. The method of discount retailing of claim 1, wherein said receiving acceptances of the discount offer price for the item over the network comprises obtaining a response from a potential consumer that the consumer accepts the offer for the item.

23. The method of discount retailing of claim 22, wherein said obtaining a response from a potential consumer that the consumer accepts the offer for the item comprises obtaining a method of payment from said consumer for the item.

24. The method of discount retailing of claim 23, wherein said method of payment comprises credit or debit card information, checking or savings account information, or information about a Paypal® account.

25. The method of discount retailing of claim 1, wherein said determining if the tipping point has been attained comprises determining if the number of acceptances to the discount offer price exceeds the tipping point for that offer.

26. The method of discount retailing of claim 1, wherein said determining if the tipping point has been attained comprises determining if the amount of money generated from the accepted offers exceeds the tipping point for that offer.

27. The method of discount retailing of claim 1, wherein said informing each consumer that accepted the discount offer whether or not the tipping point has been attained comprises providing each consumer with a certificate to be redeemed at said merchant if said tipping point was attained.

28. The method of discount retailing of claim 1, wherein said informing each consumer that accepted the discount offer whether or not the tipping point has been attained comprises providing each consumer with a indication that the tipping point was not attained if said tipping point was not attained.

29. The method of discount retailing of claim 1, wherein only one offer is presented during the predetermined period of time.

30. The method of discount retailing of claim 1, wherein only one offer is presented during the predetermined period of time in a specified geographic location.

* * * * *